United States Patent [19]
Johnson

[11] Patent Number: 5,264,958
[45] Date of Patent: Nov. 23, 1993

[54] UNIVERSAL COMMUNICATIONS INTERFACE ADAPTABLE FOR A PLURALITY OF INTERFACE STANDARDS

[75] Inventor: Daniel W. J. Johnson, Garner, N.C.

[73] Assignee: International Business Machines Corp., Armonk, N.Y.

[21] Appl. No.: 790,050

[22] Filed: Nov. 12, 1991

[51] Int. Cl.$^5$ .................. G06F 13/14; G06F 15/16
[52] U.S. Cl. ...................... 395/325; 364/DIG. 1; 364/284; 364/284.4; 364/239
[58] Field of Search .............. 395/200, 275, 325; 340/325.01; 370/85.1

[56] References Cited

U.S. PATENT DOCUMENTS

| | | | |
|---|---|---|---|
| 3,588,622 | 6/1971 | Mankowski, Jr. et al. | 317/148.5 |
| 4,358,825 | 11/1982 | Kyu et al. | 395/325 |
| 4,607,170 | 8/1986 | Wickman | 307/147 |
| 4,607,379 | 8/1986 | Marshall, Jr. et al. | 375/121 |
| 4,628,308 | 12/1986 | Robert | 340/825.43 |
| 4,647,912 | 3/1987 | Bates et al. | 340/825.5 |
| 4,803,485 | 2/1989 | Rypinski | 370/85.15 |
| 4,943,978 | 7/1990 | Rice | 370/43 |
| 5,025,412 | 6/1991 | Dalrymple et al. | 395/275 |
| 5,165,022 | 11/1992 | Erhard et al. | 395/275 |

OTHER PUBLICATIONS

IBM Technical Disclosure Bulletin, vol. 30, No. 11, Apr. 1988, pp. 478–482.

Primary Examiner—Debra A. Chun
Attorney, Agent, or Firm—Stephen T. Keohane

[57] ABSTRACT

The interface subsystem comprises a universal interface card or unit for use with any of a plurality of electrical interface standards, for example, EIA-232-D, and CCITT Recommendations V.35 and X.21. The interface subsystem further comprises a cable selected from a set of cables for use with the particular standard being utilized. The particular cable has preconditioning means so that the signals conforming to the corresponding interface standard are within a voltage-level window suitable for the universal interface unit for processing. The universal interface unit comprises an input/output port for receiving the preconditioned signals having common pins among the interface standards. The preconditioned signals are routed to one or more receivers for converting the signals to TTL level for processing by a communications processor.

8 Claims, 6 Drawing Sheets

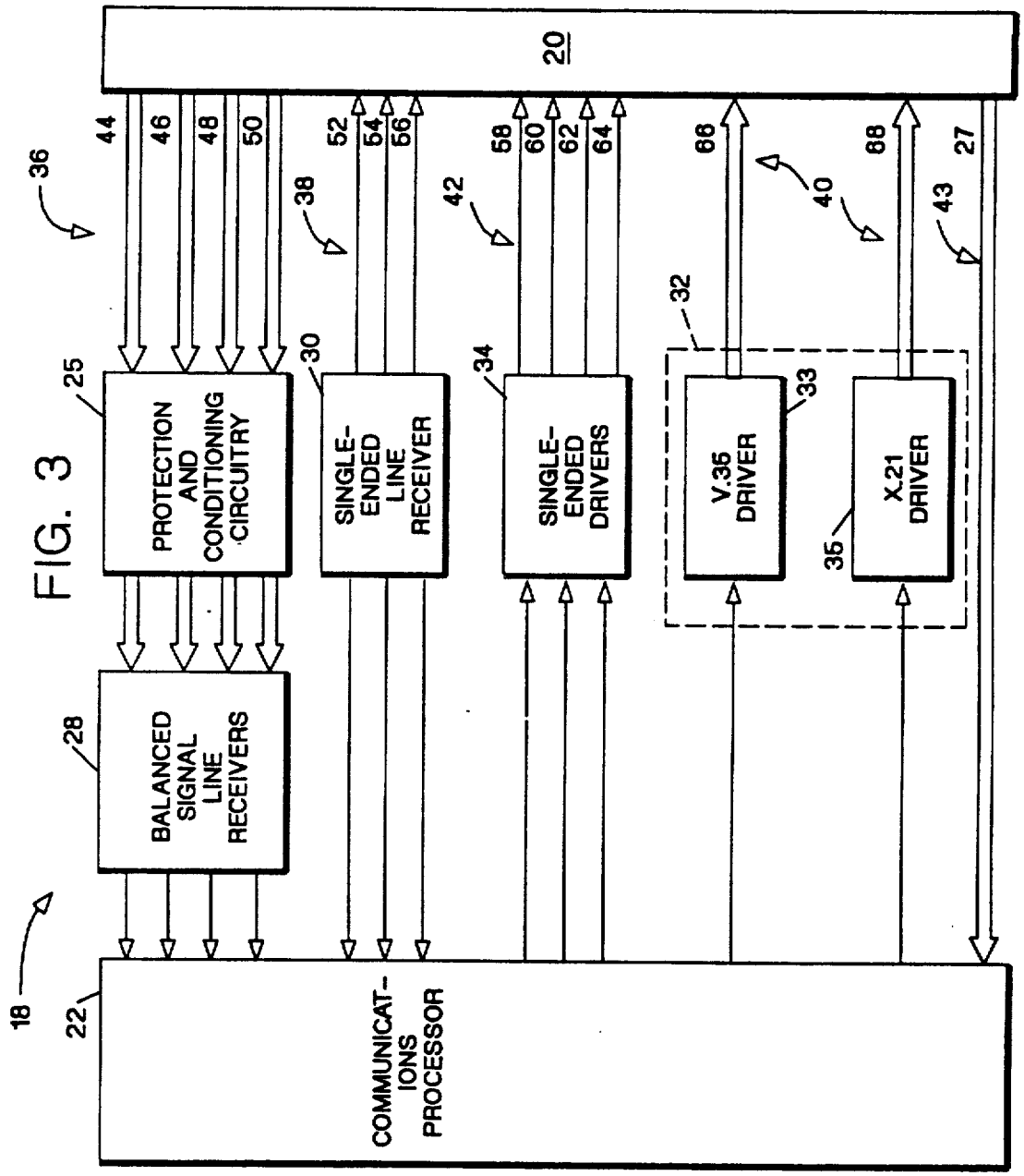

UNIVERSAL COMMUNICATIONS INTERFACE ADAPTABLE FOR A PLURALITY OF INTERFACE STANDARDS

BACKGROUND OF THE INVENTION

1. Field of the Invention

The present invention relates to interfaces in a communication network and more particularly to an interface subsystem for use in a data or telecommunications network employing the interchange of binary signals, the interface subsystem being adaptable to a plurality of electrical interface standards in the industry, such as EIA-232-D, and CCITT Recommendations V.35 and X.21.

II. Prior Art

Virtually all communications machines that use telecommunications links employ one of a plurality of standard electrical interfaces whose specifications have been developed by the Electronics Industries Association (EIA) in the United States and by the International Telegraph and Telephone Consultative Committee (CCITT in other countries of the world. The EIA and CCITT interfaces specify voltage levels whereby control and data signals are exchanged between two business machines, such as data terminal equipment (DTE) and a data circuit-terminating equipment (DCE), in two-level form. All data signals are sent across the interface, from a transmission medium, such as a cable, using a predetermined electrical interface having a two-level, bit-by-bit serial signaling convention.

Because the processing systems of a DTE and a DCE can not, in most cases, process the communication signals having parameters conforming to the predetermined electrical interface, the signals must be converted to a different voltage level so that they may be processed. Normally, an interface circuit is utilized by the DTE and DCE for converting the communication signals to levels usable by each business machine. Similarly, the interface circuit converts the signals to be transmitted by each business machine to levels conforming to the predetermined electrical interface.

A problem arises, however, where it is desired that a DTE or DCE be used with a number of different EIA and CCITT standards. For example, it may be desirable that a DTE or DCE be able to interface with EIA RS-422-A, EIA-232-D, and CCITT Recommendation V.35. Each of the three electrical interface standards has different defined voltage levels than each of the other electrical interface standards. For example, EIA RS-422-A specifies that the entire common mode voltage ($V_{cm}$) range for a receiver in a DTE or DCE shall be +7 Volts (V) to −7V and that the receiver shall operate with a maximum differential signal of 6V applied across its terminals. In contrast, EIA-232-D specifies a range of +15V to −15V and also specifies the circuit should not fail for voltages of +30V to −30V. Furthermore, V.35 defines the input voltage for the receiver to be common mode +2V to −2V and differential +0.66V to −0.66V. As a result, interface circuits cannot accommodate each of the standards with a common receiver as one receiver cannot accommodate the complete "window" of voltage levels specified by the various electrical interface standards.

Presently, this problem is solved by DTEs and DCEs each having number of interface boards, each corresponding to a particular electrical interface standard, kept available for being switched into and out of the respective DTE or DCE depending upon which electrical interface standard is being implemented at the time. Obviously, this requires that particular boards be kept available at the DTE or DCE. These boards, while not being used, are left idle and can be easily lost or damaged.

In other DTEs and DCEs, this problem is solved by having a separate cable for each of the interface standards and by routing the signals, depending upon which standard is being used, to a corresponding receiver or set of receivers. For example, a common connector is used at the interchange interface. A group of pins on that connector is dedicated to signals which are unique to the EIA-232-D interface standard. Those signals are routed to a particular receiver or set of receivers configured to receive those signals and convert them to transistor-transistor logic (TTL) level so that a communications processor in the DTE or DCE may process them. Another group of pins are dedicated to those signals unique to the RS-422-A electrical interface standard. Similarly, those RS-422-A signals are routed to receiver(s) configured to convert those signals to TTL level. The same is true for the V.35 standard and so forth. A switch is utilized to switch the appropriate receiver outputs to the communications processor. Cable identification (ID) bits in the cable are used by the switch to identify which electrical interface is being used. This method, however, consumes too much board and connector space and requires unneeded components.

SUMMARY OF THE INVENTION

It is therefore the general object of the present invention to provide a more efficient interface subsystem for use with a business machine for use in a communication or data network, such as a DTE or DCE, which is able to interface with one of a plurality of electrical interface standards.

The interface subsystem of the present invention comprises a universal interface card or unit for use with any of a plurality of electrical interface standards, in particular, EIA-232-D and CCITT Recommendations V.35 and X.21. The interface subsystem further comprises a cable selected from a set of cables for use with the particular standard being utilized. The particular cable (there is one cable for each standard to be interfaced) has passive components therein for preconditioning the signals so that the signals are within a voltage level window suitable for the universal interface unit.

The universal interface unit comprises an input/output port for receiving the preconditioned signals utilizing common pins among the interface standards, i.e., pins on the connector at the port are shared by the interface standards rather than being dedicated to groups of signals of each of the interface standards. The preconditioned signals are routed to receivers for converting the signals to TTL level for processing by a communications processor. All of the balanced (differential) signals are routed to differential receivers while the single-ended signals, if any, may be routed to the differential receivers, if any are available, or, alternatively, may be routed to a group of single-ended receivers.

Thus, the present invention provides a more efficient interface subsystem for interfacing one of a plurality of electrical interface standards by utilizing a universal interface unit for receiving the signals conforming to the various interface standards at common pin designations. One cable selected from a set of cables is connected to the universal interface unit for preconditioning the signals and conveying the signals to the universal interface unit. The particular cable selected corresponds to the electrical interface to be used. In this manner, no additional circuitry, such as dedicated receivers for the electrical interfaces or switches, are required. In addition, dedicated interface cards for the particular electrical interfaces are unnecessary.

BRIEF DESCRIPTION OF THE DRAWINGS

While the technical description concludes with claims particularly pointing out and distinctly claiming that which is regarded as the present invention, details of a preferred embodiment of the invention may be more readily ascertained from the following technical description when read in conjunction with the accompanying drawings, where:

FIG. 3 is a schematic diagram of the universal interface unit of the present invention.

DETAILED DESCRIPTION OF THE PREFERRED EMBODIMENT

Figure 1:
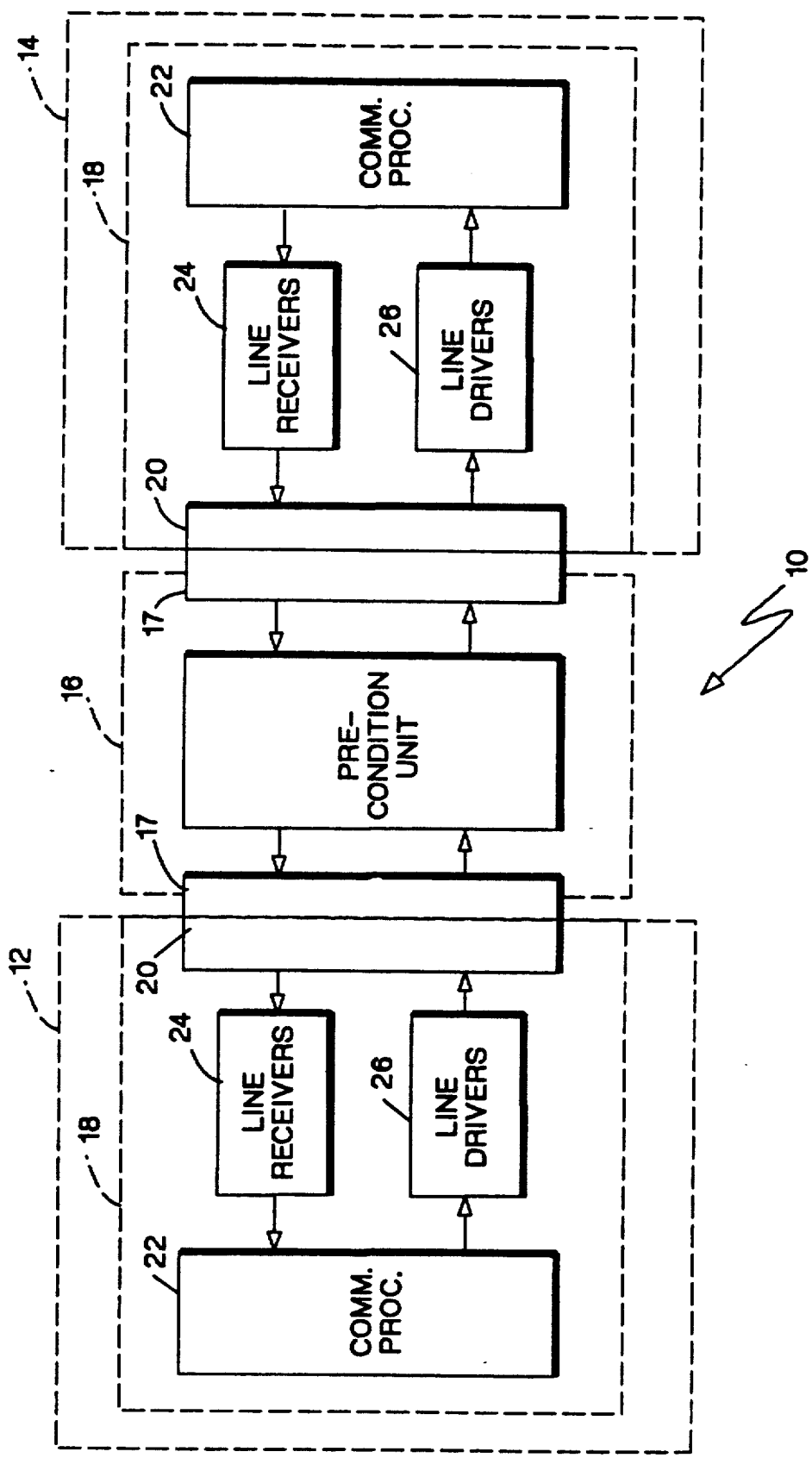
FIG. 1 is a simplified block diagram of a data or telecommunications network employing the present invention.

FIG. 1 illustrates, in block diagram form, a simplified data or communications network 10 having a data terminal equipment (DTE) 12, a data circuit-terminating equipment (DCE) 14 and an interconnecting cable 16 extending therebetween. Although the network 10 is shown having only two nodes (DTE 12 and DCE 14), the network 10 can have any number of nodes, limited only by logical protocol and physical constraints, without having any effect on the functionality of the present invention.

As in any communications network, information is transferred between the functional units, DTE 12 and DCE 14, by means of data transmission according to a logical protocol such as, for example, the Synchronous Data Link Control (SDLC) protocol. In the present case, the data transfer takes place over cable 16 between DTE 12 and DCE 14. Like other communications cables, cable 16 has connectors 17 for connecting to the functional units (DTE 12 and DCE 14). In addition, however, cable 16 has a preconditioning unit 15 for preconditioning the signals being transferred between the DTE 12 and the DCE 14.

Connecting to and interfacing with the communications cable 16 at connectors 17 is a universal interface unit 18 within the DTE 12 and the DCE 14. Each universal interface unit 18 comprises an input/output connector 20 for connecting to the corresponding cable connector 17, a communications processor 22 for processing the transferred information, a receiver (or receivers) 24 for converting the received information to a level that the processor is able process (for example, transistor-transistor logic (TTL) level), and a line driver (or line drivers) 26 for driving the information over cable 16.

In addition to following a logical protocol, the network 10 employs one of a plurality of standard electrical interfaces whose specifications have been developed by the Electronics Industries Association (EIA) and by the International Telegraph and Telephone Consultative Committee (CCITT). Some of the more common standard electrical interfaces employed are EIA-232-D, CCITT Recommendation X.21, and CCITT Recommendation V.35. These EIA and CCITT interfaces specify voltage levels whereby control and data signals are exchanged between business machines over a transmission medium in two-level form.

In accordance with the present invention, the universal interface unit 18 is used to interface with signals conforming to any of a plurality of the electrical interface standards without the need for switching between a number of dedicated receivers for signals conforming to the various interface standards.

Further in accordance with the present invention, cable 16 is one of a set of cables configured to precondition signals prior to being received by the universal interface unit 18. Each particular cable is configured for preconditioning signals conforming to a particular electrical interface standard. For example, one cable is configured to precondition signals conforming to EIA-232-D so that the universal interface unit 18 may properly receive the signals, while another cable is adapted to precondition signals conforming to CCITT Recommendation X.21 so that the universal interface unit 18 may properly receive those signals, and so forth.

Figure 2:
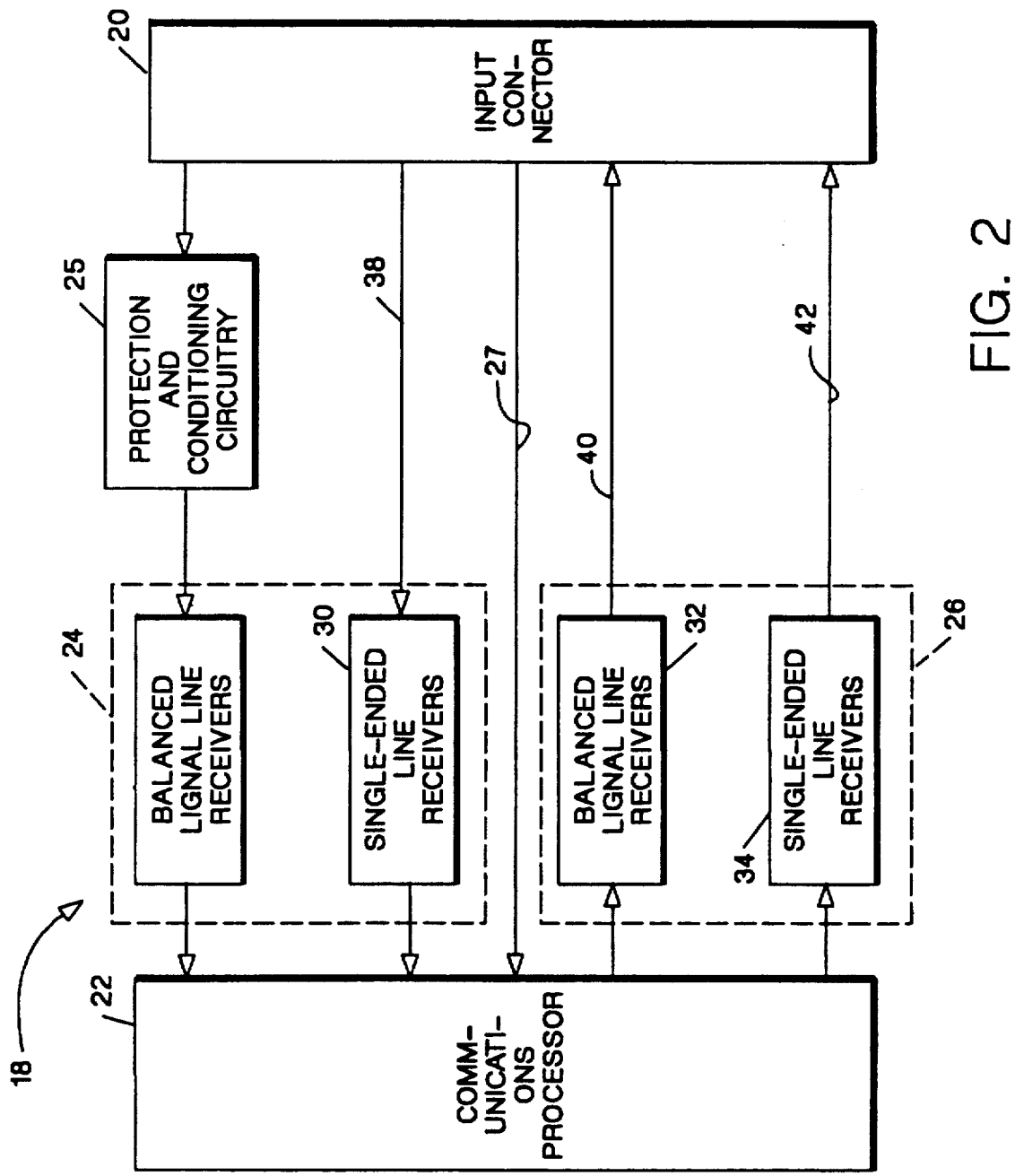
FIG. 2 is a simplified block diagram of the universal interface unit of the present invention.

Referring now to FIG. 2, the universal interface unit 18 of the present invention is shown in a block diagram. As was discussed briefly above, the universal interface unit 18 comprises a connector 20 for being connected to the standard-specific cable 16, a receiver or receivers 24, a communications processor 22 and a driver or drivers 26. In addition, the universal interface unit 18 employs over-voltage protection and signal conditioning circuitry 25 for protecting the receiver 24 from an inordinately high input voltage due to a short circuit or the like and for providing some conditioning to the input signals, such as, for instance, removing the high frequency components from the signals. Cable identification bits 27 are routed to the communications processor 22 for identifying the particular standard-specific cable 16.

Because each electrical interface standard specifies different signal characteristics, the receiver 24 and driver 26 each comprise receivers and drivers for both balanced (differential) and single-ended signals. In particular, receiver 24 comprises balanced signal line receivers 28 and single-ended line receivers 30. Similarly, driver 26 comprises balanced signal line drivers 32 and single-ended line drivers 34. In this way, received balanced signals 36 and received single-ended signals 38 are received by the appropriate receivers 28 and 30, respectively. Similarly, transmitted balanced signals 40 and transmitted single-ended signals 42 are driven by the appropriate respective drivers 32 and 34. It should be noted, however, that the received single-ended signals 38 may be received by the balanced signal line receivers 28 (one of the differential receiver inputs being tied to ground). Thus, the single-ended line receivers 30 are only needed to extent that there are no unused differential receiver line inputs for the particular electrical interface.

In accordance with the present invention, the signals conforming to each of the different electrical interface standards are routed to and received by common receivers so that receivers are not dedicated to a particular interface standard. In particular, as shown in FIG. 3, the universal interface unit 18 comprises balanced signal line receivers 28 having inputs for receiving four balanced, or differential, signal lines 36. Space allocated for these signal lines is indicated by the numerals 44, 46, 48, and 50 in interchange connector 20. As was discussed above, the balanced signal lines 44, 46, 48, and 50 are routed through the protection and conditioning circuitry 25 to protect the line receivers 28 from an inordinately high input voltage and to provide some conditioning to the input signals. In addition, the universal interface unit 18 comprises single-ended line receivers 30 having inputs for receiving three single-ended lines 38. Space allocated for these signal lines is indicated by the numerals 52, 54, and 56 in interchange connector 20.

Similarly, the universal interface unit 18 comprises balanced line drivers 32 (V.35 driver 33 and X.21 driver 35), having outputs for driving two balanced signal lines 40, and single-ended line drivers 34, having outputs for driving four single-ended signal lines 42. Connector space allocated for these signal lines is indicated by the numerals 66 and 68 (for the balanced lines 40) and 58, 60, 62 and 64 (for single-ended lines 42). The remaining two lines are cable identification (ID) lines 43 for identifying to the communications processor 22 which cable is being utilized. Connector space allocated for the cable ID lines 43 is indicated by the numeral 27 on the interchange connector 20. It should be noted that the numbers used to indicate the allocated connector space for the particular signal lines are not actual connector pin numbers and that the actual connector pin numbers may be selected as desired.

Figure 4A:
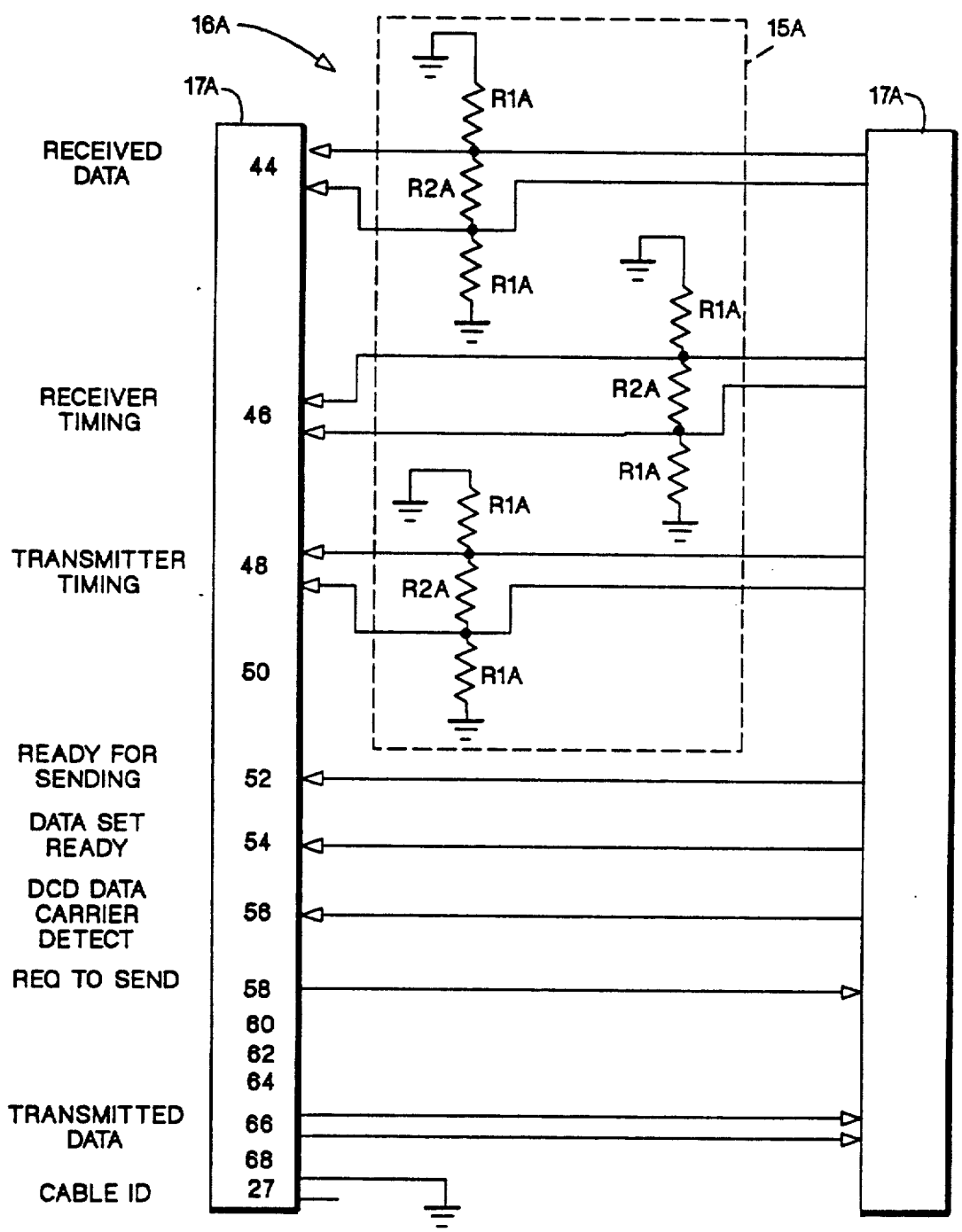
FIG. 4A is a schematic diagram of the standard-specific cable for the CCITT V.35 electrical interface.
Figure 4B:
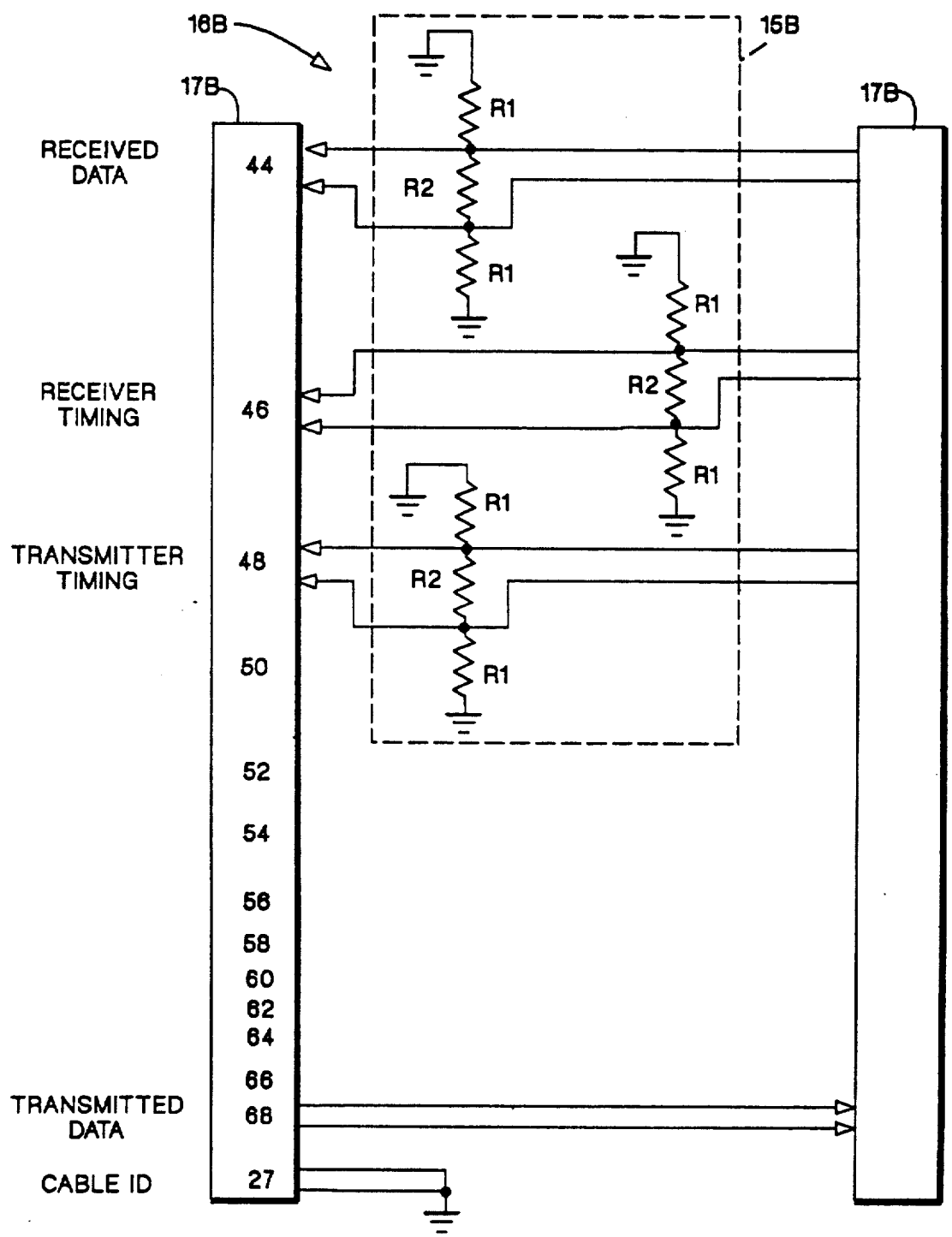
FIG. 4B is a schematic diagram of the standard-specific cable for the CCITT X.21 electrical interface.
Figure 4C:
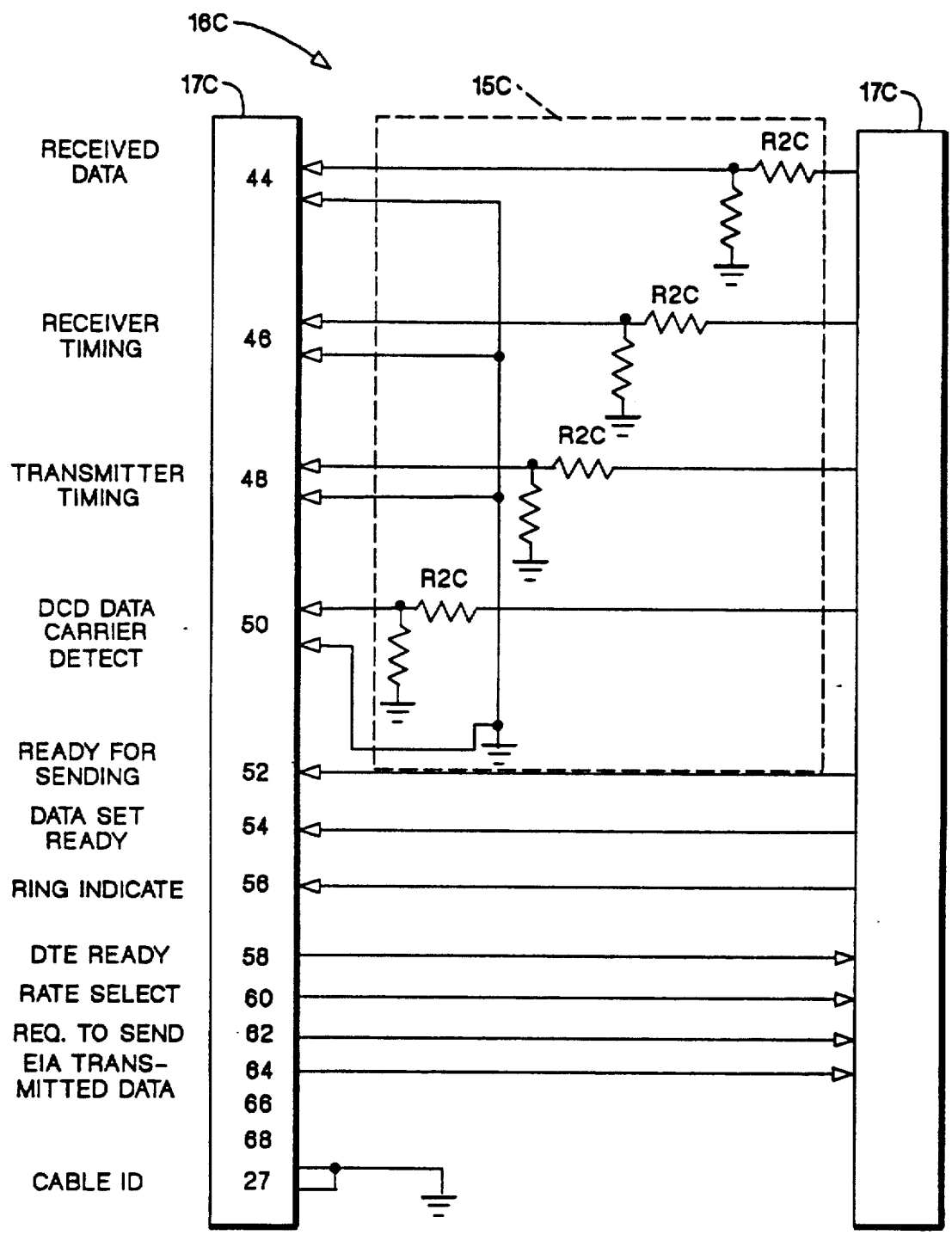
FIG. 4C is a schematic diagram of the standard-specific cable for the EIA-232-D electrical interface.

In order to illustrate how the receivers and drivers of the universal interface unit 18 are utilized as common components among the electrical interfaces, three standard-specific cables (16A, 16B, and 16C) are illustrated in FIG. 4A (CCITT V.35), FIG. 4B (CCITT X.21), and FIG. 4C (EIA-232-D).

FIG. 4A illustrates the V.35 standard-specific cable 16A for use with signals conforming to the CCITT V.35 standard. Cable 16A is utilized to connect between the universal interface unit 18 and a DCE, for example, as shown in FIG. 1. Cable 16A comprises connectors 17A for connecting to the universal interface unit at one end and to the DCE at the other. The use of the allocated connector space is determined by the electrical interface standard utilized. In this case, the V.35 standard specifies three balanced signals, RECEIVED DATA, RECEIVER TIMING and TRANSMITTER TIMING, and three single-ended signals, READY FOR SENDING, DATA SET READY, and DCD DATA CARRIER DETECT, to be transmitted to the DTE. These signals are routed to balanced line-allocated connector spaces 44, 46, 48 and single-ended-allocated connector spaces 52, 54 and 56, respectively. Similarly, the V.35 standard specifies a single balanced signal, TRANSMITTED DATA, and one single-ended signal, REQUEST TO SEND, to be transmitted by the DTE. These signals are routed to balanced line-allocated connector space 66 and single-ended-allocated connector space 58, respectively. Connector spaces 50, 60, 62, 64 and 68 are not used with the V.35-specific cable but are kept available for the other standards (X.21 and EIA-232-D) to be interfaced.

Cable 16A further comprises a preconditioning unit 15A. Preconditioning unit 15A is utilized to precondition a portion of the signals being transmitted to the universal interface unit. In particular, the preconditioning unit 15A preconditions balanced signals RECEIVED DATA, RECEIVER TIMING and TRANSMITTER TIMING. With the exception of the cable 1D signal lines, which are configured in a predetermined manner to identify the cable (one grounded, the other left floating), the remaining communication signals are fed directly through the cable 16A without any preconditioning.

Preconditioning unit 15A comprises a plurality of resistors $R_1A$ and $R_2A$, each resistor labeled $R_1A$ having a particular value and each resistor labeled R2A having another particular value. The resistors are configured so that R2A is connected between the complementary signal lines of each of the above-mentioned differential signals. A resistor having the value of $R_1A$ is connected between each complementary signal line and ground.

The resistors act as a voltage divider so that the voltage value of each signal line is a fraction of the original voltage value when transmitted. In this way, the voltage level of the specific differential signal is within a "window" of acceptable voltage values for the receiver used in the universal interface unit. In addition, resistor $R_2A$ between each differential signal line provides a specified impedance so that the cable 16A may properly interface the universal interface unit and the DCE.

With regard to signals conforming to the CCITT Recommendation X.21 electrical interface standard, the same universal interface unit is utilized and, therefore, is not shown in a figure. The only difference is the particular implementation of the unit, or, in particular, which of the available circuitry in the unit is utilized. For instance, the CCITT X.21 interface standard, as with the CCITT V.35 standard, requires the use of three balanced received signals (RECEIVED DATA, RECEIVER TIMING and TRANSMITTER TIMING). But, in contrast to the CCITT V.35 standard, no single-ended signals are received or transmitted by the DTE. Therefore, single-ended receivers 30 and single-ended drivers 34 are not utilized. These signals are appropriately terminated in the corresponding CCITT X.21 standard-specific cable.

The CCITT X.21 standard-specific cable 16B is shown in FIG. 4B. As with the V.35 cable 16A, the X.21 cable 16B comprises a preconditioning unit 15B having a plurality of resistors $R_1B$ and $R_2B$ tied to the balanced signal lines. The resistors are used for altering the voltage values of the signals so that the values are within the window of acceptable voltage values for the universal interface unit. In addition, the resistors provide each balanced signal line with the specified impedance for properly interfacing with the universal interface unit. The values of the resistors are different from those of the V.35 cable and are determined by the window of acceptable voltage values of the balanced signal line receiver 2 (FIG. 3) chosen for the universal interface unit.

As with the V.35 cable, the remaining unused space on connector 17B, i.e., reference numbers 50, 52, 54, 56, 58, 60, 62, 64, and 66, are allocated on the universal interface unit input/output port for signals conforming to other predefined electrical interface standards. Additionally, cable 1D lines at connector space 27 are both terminated, indicating to the universal interface unit that an X.21 cable is being utilized.

The EIA-232-D standard-specific cable 16C is shown in FIG. 4C. As with the other standard-specific cables, the EIA-232-D cable 16C uses a preconditioning unit 15C for preconditioning signals transmitted to the universal interface unit. Preconditioning unit 15C comprises a plurality of resistors $R_1C$ and $R_2C$ for altering the voltage values of the signals so that the values are within the window of acceptable voltage values for the universal interface unit and for providing proper impedance matching for the cable and the unit. In contrast to the V.35 and X.21 cables, no balanced signals need to be transmitted over the EIA-232-D cable. Therefore, in order to save board and connector space on the interface unit, both the single-ended signal line receivers 30 and the balanced signal line receivers 28 (FIG. 3) are utilized to receive the single-ended signal lines. But, for the balanced signal line receivers 28 to operate properly, one of the complementary signals of each balanced signal input to the balanced signal line receiver 28 must be terminated to ground. This is accomplished in the cable 16C.

As with the V.35 and X.21 cables, the remaining unused space on connector 17C, i.e., reference numbers 66 and 68, are allocated on the universal interface unit input/output port for signals conforming to other predefined electrical interface standards, in this case, the CCITT V.35 and CCITT X.21 standards.

Thus, the present invention provides a more efficient interface subsystem for interfacing one of a plurality of electrical interface standards by utilizing a universal interface unit for receiving the signals conforming to the various interface standards at common pin designations. One cable selected from a set of cables is connected to the universal interfaee unit for preconditioning the signals and conveying the signals to the universal interface unit. The particular cable selected corresponds to the electrioal interface to be used. In this manner, additional circuitry, such as dedicated receivers for the electrical interfaces or switches, are not required. In addition, dedicated interface cards for the particular electrical interfaces are unnecessary.

While the invention has been particularly shown and described with reference to preferred embodiments thereof, it will be understood by those skilled in the art that various other changes in form and detail may be made without departing from the spirit and scope of the invention.

What is claimed is:

1. For use in a network comprising a first business machine and a second business machine employing interchange of binary signals, said binary signals having signal characteristics conforming to one of a plurality of predefined electrical interfaces, an interface subsystem for receiving said binary signals from said second businesses machine, said interface subsystem comprising:
    a universal interface unit for receiving and processing said binary signals, said universal interface unit having:
        a port having a predetermined common electrical interface for receiving binary signals;
        a communications processor for processing said binary signals; and
        receiver means connected by signal lines between said communications processor and said port for receiving and conditioning said binary signals so that said binary signals may be processed by said communications processor; and
    a plurality of cables corresponding to said plurality of predefined electrical interfaces so that each cable corresponds to a unique predefined electrical interface, each cable for being individually connected between said port and said second business machine for conveying said binary signals to said port from said second business machine, each cable having a unique means for preconditioning said binary signals having signal characteristics conforming to one of said unique predefined electrical interfaces so that said binary signals have new signal characteristics conforming to said predetermined common electrical interface of said port.

2. The interface subsystem defined in claim 1 wherein said binary signals have a unique voltage level and said preconditioning means comprises at least one resistor for altering the voltage level of at least one of said binary signals.

3. The interface subsystem defined in claim 1 wherein said receiver means comprises at lest one balanced line receiver and at least one single-ended receiver.

4. The interface subsystem defined in claim 1 wherein said interface subsystem is further capable of transmitting binary signals having signal characteristics conforming to one of said plurality of predefined electrical interfaces, said interface subsystem further comprising driver means connected by signal lines between said communications processor and said port for driving said binary signals over said cable connected between said port and said second business machine.

5. A network employing interchange of binary signals conforming to one of a plurality of predefined electrical interfaces between data terminal equipment (DTE) and data circuit-terminating equipment (DCE), at least one of said DTE and said DCE having a universal interface unit for receiving and processing binary signals confoming to a predetermined common electrical interface, said universal interface unit having a port for receiving said binary signals conforming to a predetermined common electrical interface, a cable selected from a set of cables for being connected to said universal interface unit for conveying said binary signals to said universal interface unit, each cable comprising means for preconditioning said binary signals so that said binary signals conform to said predetermined common electrical interface, whereby each of said plurality of cables may be selectively connected to said universal interface unit for conveying said binary signals conforming to at least one particular electrical interface of said plurality of predefined electrical interfaces and for preconditioning said binary signals so that said binary signals conform to said predetermined common electrical interface.

6. The network defined in claim 5 wherein said binary signals have a voltage level and said preconditioning means comprises at least one resistor for altering the voltage level of at least one of said binary signals.

7. The network defined in claim 5 wherein said receiver means comprises at least one balanced line receiver and at least one single-ended receiver.

8. The network defined in claim 5 wherein said interface subsystem is further capable of transmitting binary signals conforming to one of said plurality of predefined electrical interfaces, said interface subsystem further comprising driver means connected by signal lines between said communications processor and said port for driving said binary signals over said cable connected between said port and said second business machine.

* * * * *